United States Patent
Brück et al.

(10) Patent No.: US 9,784,160 B2
(45) Date of Patent: Oct. 10, 2017

(54) HONEYCOMB BODY WITH CONNECTION-FREE REGION, EXHAUST-GAS PURIFICATION UNIT AND MOTOR VEHICLE

(75) Inventors: Rolf Brück, Bergisch Gladbach (DE); Wolfgang Maus, Bergisch Gladbach (DE); Peter Hirth, Rösrath (DE); Kait Althöfer, Wiehl (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 1673 days.

(21) Appl. No.: 12/869,859

(22) Filed: Aug. 27, 2010

(65) Prior Publication Data
US 2011/0104016 A1    May 5, 2011

Related U.S. Application Data

(63) Continuation of application No. PCT/EP2009/051377, filed on Feb. 6, 2009.

(30) Foreign Application Priority Data

Feb. 27, 2008    (DE) .................. 10 2008 011 262

(51) Int. Cl.
*F01N 3/28*    (2006.01)
*F16S 1/02*    (2006.01)

(52) U.S. Cl.
CPC .......... *F01N 3/281* (2013.01); *F01N 2260/10* (2013.01); *F01N 2330/02* (2013.01); *F01N 2330/44* (2013.01); *Y10T 428/1234* (2015.01)

(58) Field of Classification Search
CPC ........ F01N 3/281; F01N 3/0222; F01N 3/022; B01D 53/92
(Continued)

(56) References Cited

U.S. PATENT DOCUMENTS 4,818,746 A    4/1989  Cyron
5,382,774 A *  1/1995  Bruck et al. .................. 219/553
(Continued)

FOREIGN PATENT DOCUMENTS

DE    10 2004 058 285 A1    6/2006
DE       102005028044 A1    12/2006
(Continued)

OTHER PUBLICATIONS

International Search Report of PCT/EP2009/051377, Dated May 27, 2009.

*Primary Examiner* — Humera Sheikh
*Assistant Examiner* — Xiaobei Wang
(74) *Attorney, Agent, or Firm* — Laurence A. Greenberg; Werner H. Stemer; Ralph E. Locher

(57) ABSTRACT

A honeycomb body includes at least a housing and a honeycomb structure having a plurality of channels. The honeycomb structure is formed of at least one at least partially structured metallic layer that forms connecting points fixing the honeycomb structure. At most 20% of inner contact points in a cross section of the honeycomb structure form a connection point, and the connection points are disposed at a distance from each other in such a way that respective connection-free regions of the same size surround each of the connection points. An exhaust-gas purification unit and a motor vehicle are also provided.

10 Claims, 4 Drawing Sheets

(58) Field of Classification Search
USPC .......................................................... 428/116
See application file for complete search history.

(56) References Cited

U.S. PATENT DOCUMENTS

| | | |
|---|---|---|
| 7,789,947 B2 | 9/2010 | Hodgson |
| 8,173,268 B2* | 5/2012 | Maus et al. .................... 428/593 |
| 2001/0013390 A1* | 8/2001 | Staubwasser ................. 156/205 |
| 2005/0054526 A1* | 3/2005 | Steinke et al. ................ 502/439 |
| 2007/0259198 A1* | 11/2007 | Althofer et al. ............... 428/553 |
| 2008/0182066 A1 | 7/2008 | Voit et al. |

FOREIGN PATENT DOCUMENTS

| | | |
|---|---|---|
| DE | 102005038572 A1 | 2/2007 |
| EP | 0 220 468 A1 | 5/1987 |

\* cited by examiner

HONEYCOMB BODY WITH CONNECTION-FREE REGION, EXHAUST-GAS PURIFICATION UNIT AND MOTOR VEHICLE

CROSS-REFERENCE TO RELATED APPLICATION

This is a continuation, under 35 U.S.C. §120, of copending International Application No. PCT/EP2009/051377, filed Feb. 6, 2009, which designated the United States; this application also claims the priority, under 35 U.S.C. §119, of German Patent Application DE 10 2008 011 262.3, filed Feb. 27, 2008; the prior applications are herewith incorporated by reference in their entirety.

BACKGROUND OF THE INVENTION

Field of the Invention

The present invention relates to a honeycomb body which has at least a housing and a honeycomb structure including a multiplicity of channels. The honeycomb structure is formed with at least one at least partially structured metallic layer which forms connecting points for fixing the honeycomb structure. At most 20% of inner contact points in a cross section of the honeycomb structure form a connecting point. The invention also relates to an exhaust-gas purification unit having at least one honeycomb body and a motor vehicle having at least one exhaust-gas purification unit. Honeycomb bodies of that type, which are distinguished by a high degree of internal flexibility, are used in particular as catalyst carrier bodies in exhaust systems of mobile internal combustion engines.

In the exhaust-gas purification of internal combustion engines, such as for example diesel or spark-ignition engines, honeycomb bodies have the advantage of having a particularly large surface area, such that very close contact is ensured between the exhaust gas flowing through and the channel walls. The surface area, which in principle is formed by the channel walls, is often coated with suitable, if appropriate different catalysts, in order to enable a conversion of pollutants contained in the exhaust gas.

Honeycomb bodies of that type may be in principle be produced from ceramic or metallic material. Recently, however, the metallic catalyst carrier body has become particularly favored because, in that case, it is possible to work with very thin materials, for example sheet-metal foils with a thickness of less than 80 μm or even less than 50 μm. Such thicknesses provide a very large geometric surface area and a significantly reduced pressure loss of the exhaust gas flow as it flows through the honeycomb body as compared to ceramic substrate structures. A further advantage is that, in that case, a very simple connection to the rest of the exhaust system (for example the exhaust pipe) is made possible, because in each case metallic materials are combined with one another.

A honeycomb structure of that type is, however, subjected to a multiplicity of different loadings over its life cycle in a mobile exhaust system. In that case, it should also be taken into consideration that specifically the superposition of the partially extreme loadings enduringly influences the durability of such honeycomb bodies. For example, thermal loading, such as for example extreme temperature peaks (up to over 1,000° C.), considerable rates of change of temperature during heating and cooling, and temperature distribution of the inflowing exhaust-gas flow, can be a significant factor. That likewise applies with regard to mechanical loading, specifically for example with regard to maximum acceleration level, frequency range of excitation with regard to natural or characteristic frequencies as well as gas dynamic loading as a result of gas pulsation. That makes it clear that specifically the connecting regions of the individual components (sheet-metal foils, housing, etc.) of a honeycomb body to one another are subjected to particularly high loadings, and should where possible withstand the constantly changing thermal and/or dynamic loadings for a very long time.

Connecting techniques are known in which brazing material (as a brazing foil, brazing powder and/or brazing paste) is positioned in certain zones of a honeycomb body of that type in order to connect the metallic components to one another. Strip-shaped encircling zones are regularly formed between the housing and the sheet-metal foils of the honeycomb body, wherein those zones may extend over a part of the axial length or over the entire axial length of the honeycomb body or of the housing. In order to connect the sheet-metal foils to one another, it may likewise be considered known for them to be connected to one another over the entire cross section in an axial partial region of the honeycomb body. In addition and/or alternatively thereto, it is also possible to form zones (as viewed from the end side) which include a multiplicity of channels in which a connection is formed. It is thus possible to generate end-side patterns, for example in the manner of concentric rings, strips, triangles and the like.

Even though a multiplicity of different proposals has already been made with regard to the structure of such a brazing pattern, with regard to durability, they however cannot withstand all of the presently prevailing conditions in the exhaust system of a motor vehicle. In specifying a structure for a brazing pattern of a honeycomb body of that type, it is possible to take into consideration a multiplicity of different criteria on one hand in order to obtain adequate flexibility and on the other hand in order to obtain durability of the honeycomb structure. Furthermore, in producing a brazing pattern of that type, it should also be taken into consideration that the brazing connections must be realized in such a way that they can be reproduced, precisely positioned and produced by using a reliable process.

SUMMARY OF THE INVENTION

It is accordingly an object of the invention to provide a honeycomb body with a connection-free region, an exhaust-gas purification unit and a motor vehicle, which overcome the hereinafore-mentioned disadvantages of and at least partially solve the problems highlighted with regard to the heretofore-known devices of this general type. In particular, it is sought to specify a honeycomb body which has a considerably improved service life under the extreme thermal and dynamic loadings in the exhaust system of an automobile. In this case, in particular, the connecting points should be disposed relative to one another so as to provide a brazing pattern which is independent of the construction of the honeycomb structure. The honeycomb body should additionally be distinguished by considerably improved thermoshock characteristics and/or improved vibration characteristics.

With the foregoing and other objects in view there is provided, in accordance with the invention, a honeycomb body, comprising at least a housing and a honeycomb structure having a cross section within the housing and at least one at least partially structured metallic layer forming a multiplicity of channels and inner contact points within the cross section. At most 20% of the inner contact points in the cross section form respective connecting points for fixing the honeycomb structure and the connecting points are spaced apart from one another to define connection-free regions of equal size each surrounding a respective one of the connecting points.

With regard to the number of channels, it is preferable for the honeycomb body to be constructed with a channel density of cells per square inch (cpsi) in a range of from 100 to 1,000, in particular from 200 to 600. It is also preferable for a plurality of smooth and structured (for example corrugated) sheet-metal foils to be used to produce the honeycomb body. Even though sheet-metal foils of this type can, for example, be coiled in spiral fashion, it is however preferable for the sheet-metal foils to have a profile differing therefrom, for example an S-shaped, V-shaped, W-shaped, U-shaped or similar profile. The configuration of the sheet-metal foils relative to one another is then carried out in such a way that they ultimately uniformly fill out the (round, oval or similar) cross section of the honeycomb body. The sheet-metal foils are then connected to one another (in a force-locking manner) at various positions, so-called connecting points. These preferably involve a brazed connection, in particular a high-temperature vacuum brazed connection. It is therefore also clear that the profile direction generally relates to the finished (coiled or wound) honeycomb body. A force-locking connection is one which connects two elements together by force external to the elements, as opposed to a form-locking connection which is provided by the shapes of the elements themselves.

With regard to the connecting points, it should be noted that they serve to fix the position of sections, which bear against one another or are disposed adjacent one another, of the at least one metallic layer. The layers conventionally form with one another a multiplicity of contact points, that is to say points at which sections of the same metallic layer or different metallic layers bear against one another. Specifically taking into consideration the number of channels, regularly one contact point, usually two contact points, are formed per channel. With regard to the contact points, it is proposed that at most 20% of the contact points be used for a connecting point. It is very particularly preferable for at most 10% or even only at most 1% of the inner contact points in a cross section of the honeycomb structure to form a connecting point. This does not include outer contact points, at which there is contact between the honeycomb structure or the metallic layer and the housing. It is clear from this that the honeycomb structure is not of rigid construction but rather is of flexible construction in cross section in the radial direction and/or in the direction of the circumference, and can therefore permanently withstand the changing thermal loads in the exhaust system of an internal combustion engine.

In particular, regardless of the profile of the at least partially structured metallic layer, the connecting points are distributed over the cross section of the honeycomb structure in such a way that (as viewed in cross section) the connecting points are each surrounded by a connection-free region. This means, in particular, that no brazed connections and preferably no (undesired) diffusion connections are formed in this case. The region may have a different areal shape, but it is preferable for the region around the connecting points to be approximately circular. In this case, the size of the region should be selected so as to be as large as possible, that is to say all the connecting points provided over the cross section of the honeycomb structure under consideration are therefore positioned with the greatest possible spacing from one another, wherein a uniform distribution of the connecting points over the cross section is preferably realized at the same time. The connection-free region surrounding the connecting points preferably has an area in a range of from 0.5 to 5 $cm^2$, and/or a radius in a range of from 5 to 15 mm.

In this case, it should also be taken into consideration that the specification of the brazing pattern proposed herein should be realized specifically for honeycomb structures which have a complex construction composed of metallic layers which are for example wound in an S-shape. In this case, despite the special coiling or winding of the metallic layers to form a honeycomb structure, a positioning of the connecting points is selected in such a way that only the cross-sectional shape and/or the position of the contact points is taken into consideration. The profile of the layer itself is of merely secondary importance in this case. Even though this possibly leads to a higher level of production expenditure, specifically if the connecting points are defined before the coiling or winding of the layer to form a honeycomb structure, the uniform distribution of the connecting points over the cross section surprisingly ultimately permits improved thermal expansion behavior of the honeycomb structure.

In accordance with another feature of the honeycomb body of the invention, the honeycomb structure is formed with at least one stack composed of a plurality of alternating structured sheet-metal foils and smooth metallic layers, with the connecting points on a structured sheet-metal foil being positioned in an alternating fashion to adjacent metallic layers. This means, in particular, that structured sheet-metal foils and smooth sheet-metal foils (or smooth nonwovens, sintered materials, etc.) are disposed one on top of the other in an alternating fashion and thereby form a stack which is subsequently coiled and/or wound in such a way that the cross section of the honeycomb structure is produced with the desired external shape (that of the housing). Considering a single structured sheet-metal foil, this has a top side and a bottom side, with the sheet-metal foil being in contact in each case with the top side and the bottom side with (other) metallic layers. The (inner) contact points can be used to provide a connecting point. It is proposed in this case that, in the direction of the structured sheet-metal foil, the connecting points are formed in an alternating fashion, that is to say one on the top side and one on the bottom side.

In accordance with a further feature of the invention, the connecting points along a metallic layer are formed with different spacings from one another. This means, in other words, that the spacing between all connecting points is preferably not constant. The spacing will generally not change, that is to say increase or decrease, along a metallic layer constantly. In fact, the spacings in relation to adjacent connecting points differ significantly. In special cases, it may also be the case that, in a metallic layer, it is not possible to identify a uniform spacing with regard to the connecting points realized in that layer. The spacing actually to be set is determined in advance by calculation, wherein the final brazing pattern according to the invention in the finished honeycomb structure is achieved.

In accordance with an added feature of the honeycomb body of the invention, the connecting points are brazing points which are formed adjacent extrema of the at least partially structured metallic layer. "Brazing points" means, in particular, connections which are produced by technical joining (brazing, sintering or welding) and in which hard soldering or brazing has been used. The brazing points are thus produced in particular through the use of a high-temperature vacuum brazing process. The extrema formed by the structure (for example wave peaks and wave troughs) ultimately form the inner contact points, with the brazing points adjoining the contact points. It is very particularly preferable for the extremum itself to be free from brazing material, but for the brazing points to be formed at both sides as flanking brazing strips. A connecting point includes at most one brazing point of two directly adjacent extrema of one orientation (that is to say only wave peaks or only wave troughs). It is preferable for a connecting point to have only brazing points to a single extremum.

In accordance with an additional feature of the invention, the connecting points are formed only in at least one partial section of the extent of the honeycomb structure in the direction of the axis thereof. This means, in particular, that the connecting points are formed only over a part of the channel length. The extent of the honeycomb structure is regularly delimited by the end sides thereof, which end sides permit the inflow of exhaust gas into the honeycomb structure and the outflow of exhaust gas out of the honeycomb structure. It is preferable for one partial section to be provided close to the first end side and for a further partial section to be provided close to the second end side, while the rest of the extent does not have a cross section with connecting points. The partial section encompasses, for example, 5 to 10 mm proceeding from an end side.

In accordance with yet another feature of the honeycomb body of the invention, two partial sections are provided which are spaced apart from one another in the direction of the axis, with the connecting points overlapping in the direction of the axis. This means, in particular, that a connecting point in a first partial section is disposed congruently, as viewed in the direction of the direction of the axis or along a channel, with respect to another connecting point in the second partial section. It has been found that a honeycomb structure of this type is subjected to positive thermoshock at the flow inlet side and negative thermoshock at the flow outlet side. This means, in particular, that the positive thermoshock generates radial compressive stresses there which, due to the distributed configuration of the brazing points, can for example be effectively compensated through the use of torsion of the sheet-metal foils. On the other hand, radial tensile stresses, for example, prevail at the outlet side, which radial tensile stresses can likewise be effectively compensated through the use of the brazing pattern proposed herein. Regardless of this, the at least one axial partial region or cross section including the connecting points may also be provided at other positions, for example in the region of the axial center of the honeycomb structure.

In accordance with yet a further feature of the invention, a reliable connection of the highly flexible honeycomb structure to the housing may be obtained in that the honeycomb structure is connected to the housing through the use of all of the metallic layers and over the entire extent of the honeycomb structure. It is very particularly preferable for all of the metallic layers to be disposed so as to bear in each case with both of their ends against the housing, and to thereby be connected to the housing, preferably through the use of a brazing connection, over the entire extent of the ends.

In accordance with yet an added feature of the invention, in order to save brazing material for connecting the metallic layers to the housing, an encircling strip pattern could for example also be advantageous, in which the honeycomb structure is thus connected to the housing through the use of all of the metallic layers but only over a part of the entire extent of the honeycomb structure. In particular, encircling strips in the region of the end sides and/or the axial center may be advantageous, with preferably a width of 5 mm to 10 mm being proposed.

In accordance with yet an additional feature of the honeycomb body of the invention, the at least one at least partially structured metallic layer is formed with at least one protuberance or an opening. It is preferable for a layer to be formed as a sheet-metal foil with a multiplicity of protuberances and openings per channel. Preferred embodiments are shown in the figures.

With the objects of the invention in view, there is also provided an exhaust-gas purification unit, comprising at least one honeycomb body according to the invention.

With the objects of the invention in view, there is concomitantly provided a motor vehicle, comprising at least one exhaust-gas purification unit having at least one honeycomb body according to the invention.

A honeycomb body of this type is particularly preferably used in an exhaust-gas aftertreatment unit, in particular in that of a motor vehicle.

Other features which are considered as characteristic for the invention are set forth in the appended claims, noting that the features specified individually in the claims may be combined with one another in any desired technologically meaningful way and form further embodiments of the invention.

Although the invention is illustrated and described herein as embodied in a honeycomb body with a connection-free region, an exhaust-gas purification unit and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The description, in particular in conjunction with the figures, explains the invention further and specifies additional particularly preferred structural variants of the invention.

DETAILED DESCRIPTION OF THE INVENTION

Figure 1:
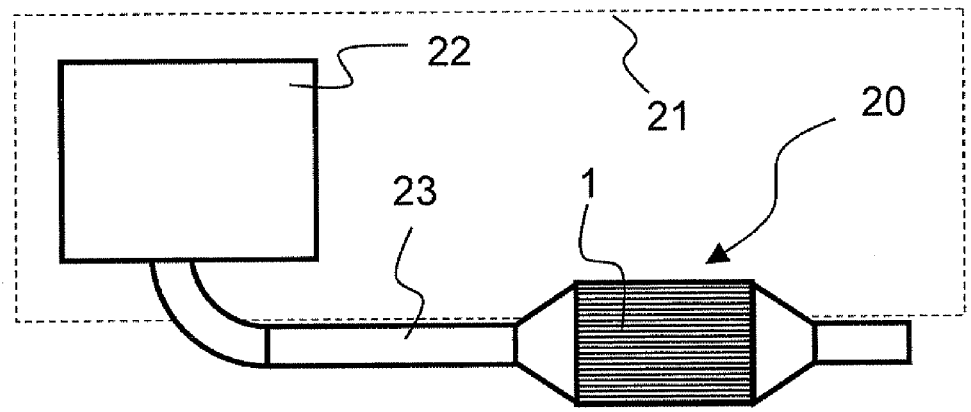
FIG. 1 is a diagrammatic, plan view of a motor vehicle having an exhaust system.

Referring now in detail to the figures of the drawings, with which the technical field as well as particularly preferred structural variants that are not intended to restrict the invention will now be explained, and first, particularly, to FIG. 1 thereof, there is seen a diagrammatically illustrated structure of a mobile exhaust system for a motor vehicle 21. The motor vehicle 21 has an internal combustion engine 22, for example a spark-ignition or diesel engine. The fuel which is burned therein is conducted, as exhaust gas, through a corresponding exhaust line 23 to an exhaust-gas treatment unit 20. There, pollutants contained in the exhaust gas are at least partially converted and/or retained, in such a way that ultimately only relatively non-harmful exhaust-gas constituents flow into the atmosphere. It is clear that the number, type and/or position of such exhaust-gas treatment units 20 in an exhaust system of this type may be varied in numerous respects. The illustration shown herein consequently shows, merely by way of example, a possible embodiment for a honeycomb body 1 according to the invention, which is shown therein in the exhaust line 23.

Figure 2:
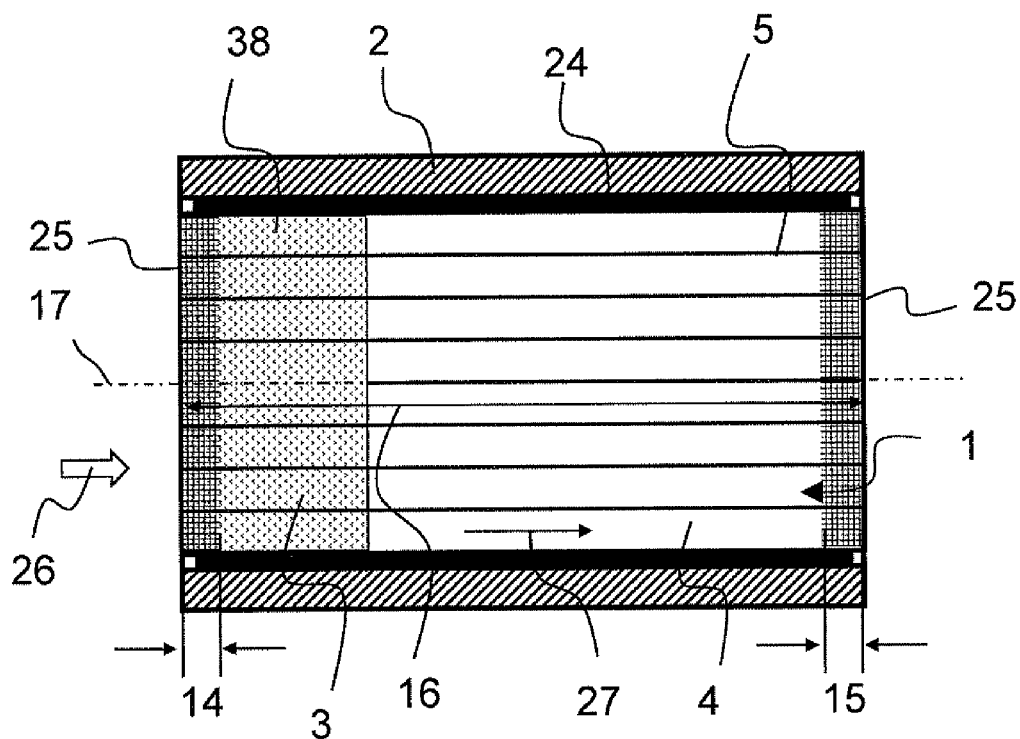
FIG. 2 is an enlarged, longitudinal-sectional view of a structural variant of a honeycomb body.

The structure of a honeycomb body 1 can be seen, for example, from FIG. 2. FIG. 2 shows a longitudinal section through a (round) honeycomb body 1 along its axis 17. The honeycomb body 1 is delimited at the outside by a housing 2 which is formed, in particular, as a metallic tube. In the interior of the housing 2, a honeycomb structure 3 is formed with a multiplicity of channels 4. The (separate, at least partially mutually detached) channels 4 extend between two end sides 25 and are disposed substantially parallel to one another. In this case, the channels 4 run substantially parallel to the axis 17. This is, however, not imperatively necessary. Additionally, the channel walls need not run rectilinearly. It is also possible for profilings (for example guide surfaces) which point in the direction of the axis 17 to be provided and/or for openings which connect adjacent channels 4 to be provided.

The channels 4 of the honeycomb structure 3 are often provided with a catalytically active coating 38 which may be provided over a part of an extent 16 of the honeycomb structure 3, as shown herein, or over the entire extent 16 of the honeycomb structure 3. The exhaust gas which ultimately flows in this case in a flow direction 26 is thus brought into contact with the catalyst, which assists the conversion of the pollutants in the exhaust gas. For this purpose, it is possible for turbulence points and/or calming zones to be provided in or with the channels 4. The turbulence points and/or calming zones improve the contact of the exhaust gas with the channel wall.

A casing connection 24 is formed (preferably as a brazed connection) between the honeycomb body 3 and the housing 2. The casing connection 24 extends substantially over the entire extent 16 of the honeycomb structure 3. This ensures, in particular, that all of the sheet-metal foils or metallic layers provided for constructing the honeycomb structure 3 are securely connected to the housing 2.

An axial region of the honeycomb structure in which the cross section is formed with connecting points is shown in each case by hatching close to the two end sides 25. It should be clarified that (even though the entire region is hatched herein) in that region the connecting points are only spaced at a distance from each another and eventually offset with respect to each another. In this case, the connecting points extend at an end side 25 over a first partial section 14 and a second partial section 15 with a maximum width of at most 15 mm, but preferably a maximum width of 5 mm.

Figure 3:
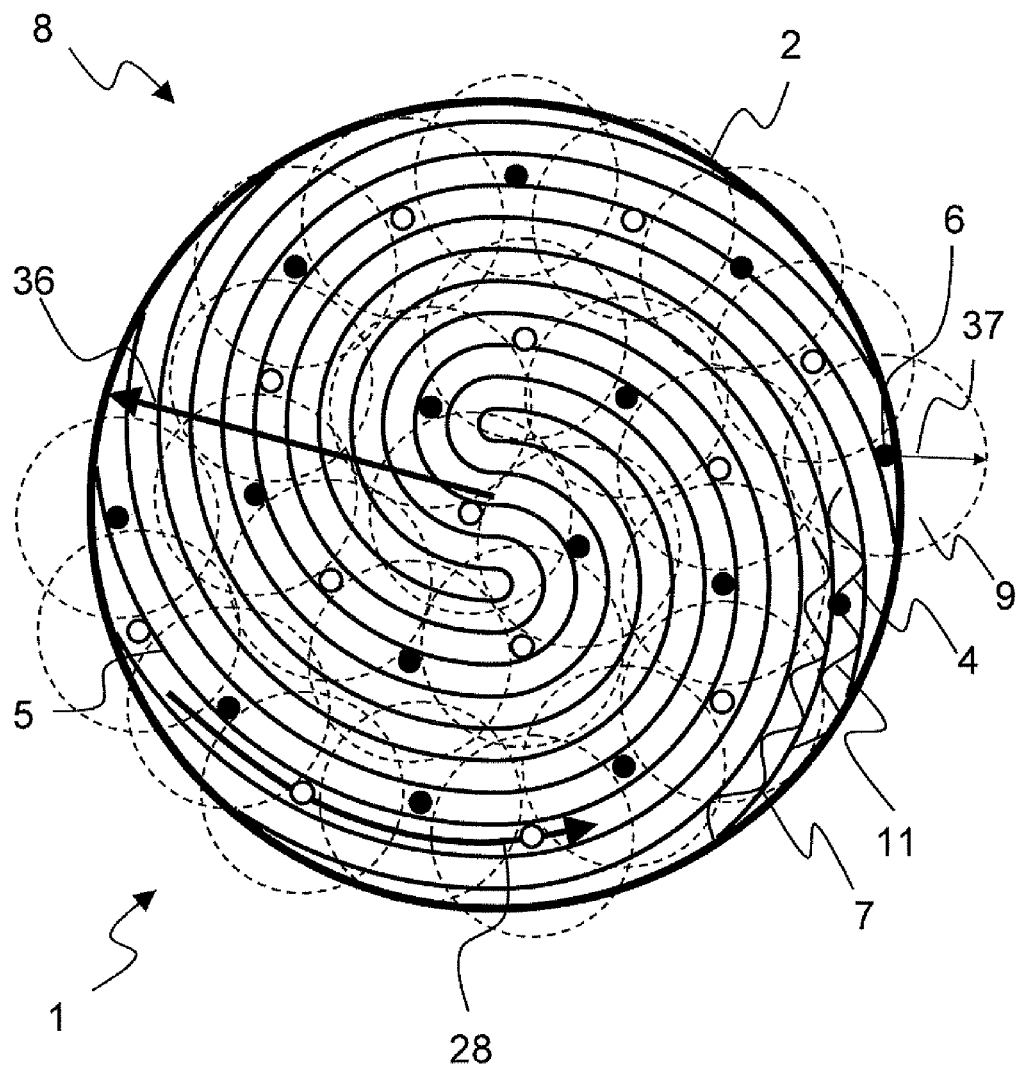
FIG. 3 is a reduced, cross-sectional view of an embodiment of a honeycomb body according to the invention.

FIG. 3 shows a cross section through a honeycomb body 1 in which connecting points 6 are formed. The illustration shows the housing 2 in which a plurality of smooth metallic layers 5 and structured sheet-metal foils 11 are alternately disposed, wound in an S-shape and positioned in a wound manner, so as to fill an entire cross section 8 within the housing 2. The smooth layers 5 and structured or corrugated sheet-metal foils 11, which bear against one another, form the channels 4. In FIG. 3, the configuration of the connecting points 6 has been shown by way of example for a single layer 5.

The smooth layers 5 and corrugated sheet-metal foils 11 form a multiplicity of contact points 7 with one another, that is to say points at which sections of the same metallic layer or sheet-metal foil or different metallic layers or sheet-metal foils bear against one another. More specifically, one or two contact points are formed per channel 4. Furthermore, at most 20% of the contact points 7 are provided with a connecting point 6, although it is possible for at most 10% or even only at most 1% of the inner contact points 7 within the cross section 8 of the honeycomb structure to form a connecting point 6. This does not include outer contact points, at which there is contact between the honeycomb structure 3 or the smooth layers 5 and corrugated sheet-metal foils 11 and the housing 2.

The connecting points 6 are provided with different coloring, which is intended to illustrate that the connecting points 6 are provided alternately toward a top side and toward a bottom side in a curve, course or profile direction 28 of the layer 5. Therefore, the color markings (light and dark) of the connecting points 6 alternate in the profile direction 28. Furthermore, a connection-free region 9 is shown around each connecting point 6 through the use of a dashed circle. In this case, each connection-free region 9 has the same extent 37, but this is not imperatively necessary. In the cross section 8 shown herein, it can be seen that the frequency of the connecting points 6 in a reference segment is identical, or the distribution of the connecting points 6 over the radius of the honeycomb structure 3 or over the cross section 8 is highly uniform.

Figure 4:
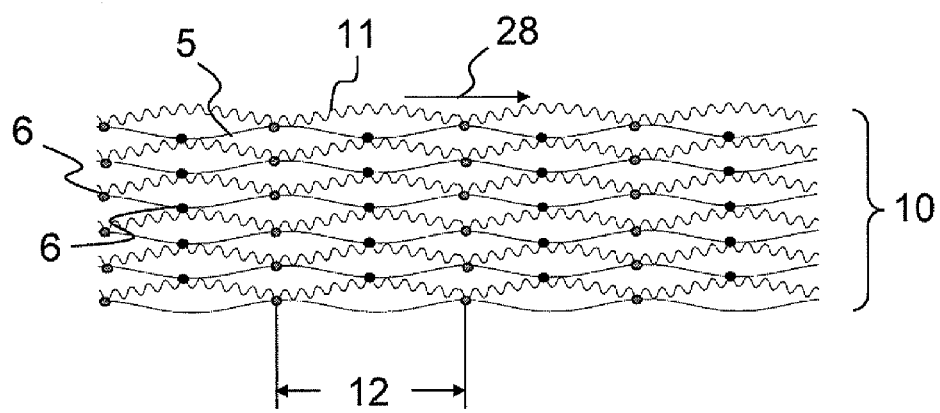
FIG. 4 is a fragmentary view of a stack for a honeycomb body according to the invention.

FIG. 4 shows a stack 10 having a multiplicity of structured sheet-metal foils 11 and smooth layers 5 (for example likewise sheet-metal foils or metallic mats or fleece). In this case, the stack 10 is illustrated in a still-unwound state, that is to say it has a substantially rectilinear course or profile direction 28. The connecting points 6 between the sheet-metal foils are also illustrated, with different coloring. Due to the fact that the formation of such connecting points 6 (brazed connections) first takes place in the assembled state, that is to say in the wound state, in the interior of the housing, FIG. 4 shows, in particular, positions for an adhesive agent on which, for example, powdered brazing material is positioned after a coiling process. The brazing material ultimately serves to generate the top-side connecting points (marked herein by dark points) and bottom-side connecting points (marked herein by light points), which are illustrated herein by way of example and illustratively, in relation to the structured sheet-metal foil 11. It is shown at the bottom of FIG. 4 that the identical bottom-side connecting points, that is to say in this case the connecting points to the lower smooth layer 5, maintain a specified spacing 12 in the course or profile direction 28 of at least 20 mm, for example. In the brazing pattern of the finished honeycomb body illustrated herein, it can be regularly assumed that the mutually adjacent connecting points do not have a constant spacing 12 in the course or profile direction 28 of the finished honeycomb body 1.

Figure 5:
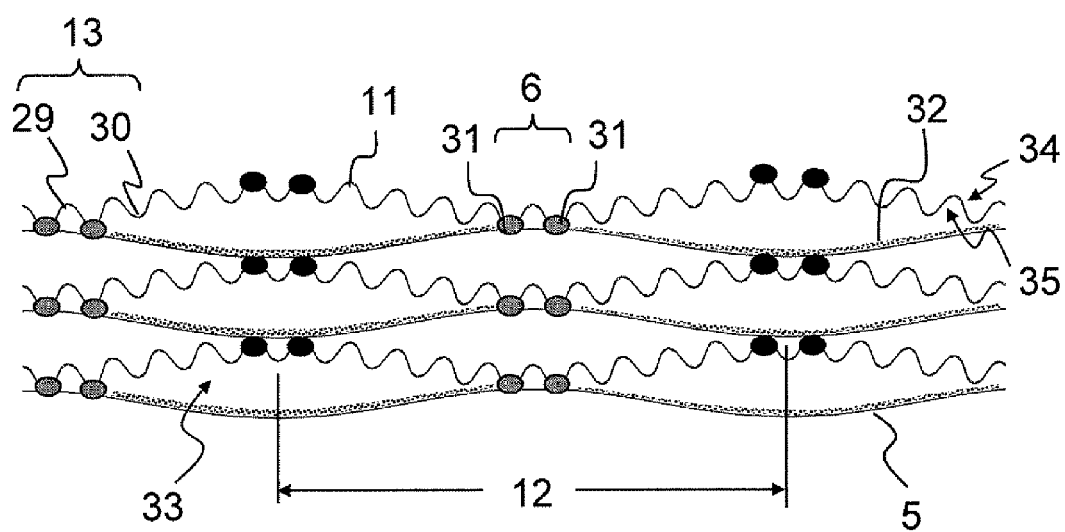
FIG. 5 is a fragmentary view of another structural variant of a stack for a honeycomb body.

FIG. 5 shows a variant in which each connecting point 6 is formed with two brazing points 31 on adjacent structure extrema 13, that is to say either an elevation 29 (wave crest or peak) or a depression 30 (wave valley or trough). A multiplicity of extrema 13 of the structure of the structured sheet-metal foil 11 is provided between the connecting points 6. It is merely pointed out at this juncture that the number of structure extrema 13 between the homogeneous connecting points (connecting points illustrated in the same color) in the course or profile direction is normally considerably higher than that illustrated herein by way of example. In particular, at least 15 structure extrema are situated in between.

Furthermore, it can be seen from FIG. 5 that the smooth layers 5 are provided with a connection prevention coating 32. Even though the connection prevention coating 32 is preferably provided on the top side 34 and the bottom side 35 of the smooth layers 5 (in particular sheet-metal foils), the provision of an oxide layer on one side may suffice in exceptional situations. At any rate, it should be ensured in this way that a connection of the metallic layers, for example as a result of diffusion, is prevented, and relatively large cells 33 can consequently be formed under loading. In other words, it is possible as a design rule to provide that such a cell 33 is formed, for example, with a section of a smooth layer 5 and a section of a structured sheet-metal foil 11, with the cell 33 being delimited by two identical connecting points (shown herein for bottom-side connecting points), and furthermore with a cell boundary formed by the structured sheet-metal foil 11 being formed with at least 15 structure extrema 13. This provides a particularly high degree of deformability of the cells 33 or flexible configuration of the adjacent sheet-metal foils, specifically both in the course or profile direction 28 and also transverse thereto.

Figure 6:
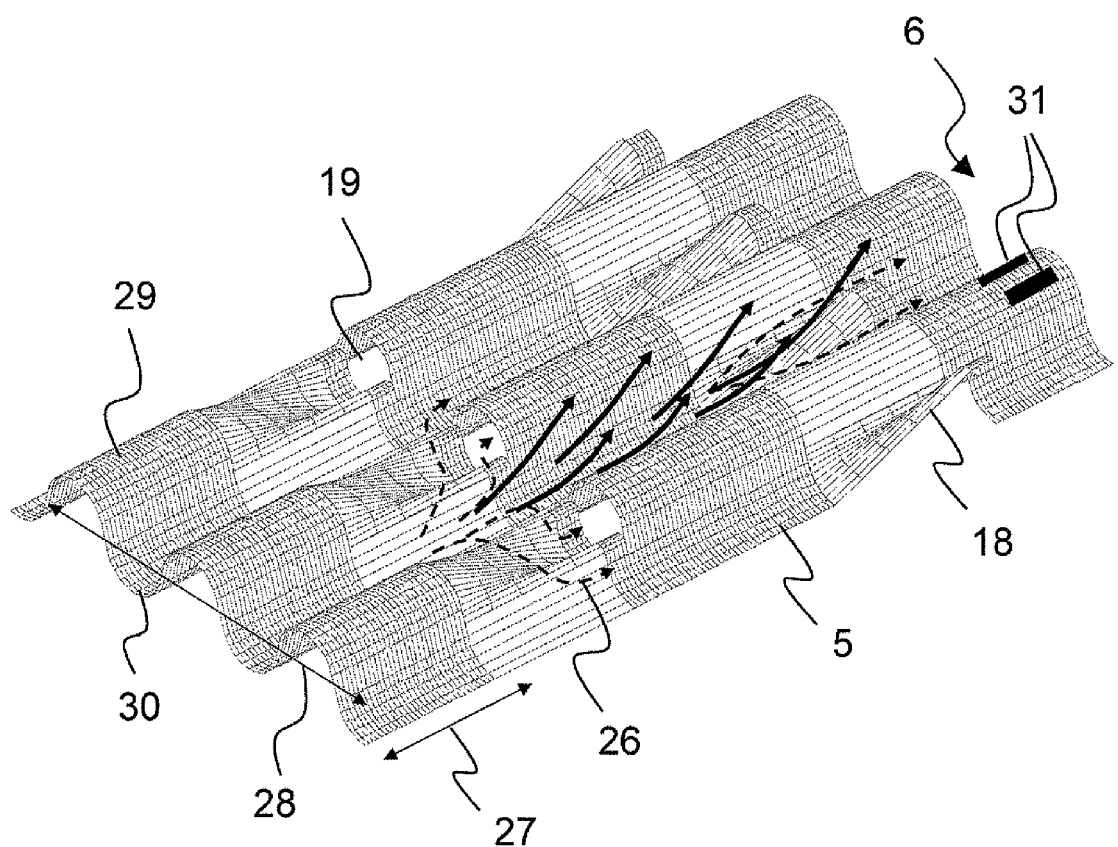
FIG. 6 is a perspective view of an example of a structured metallic layer.

FIG. 6 shows a particularly preferred structural variant of a structured layer 5, or of a structured sheet-metal foil 11, for which the invention can be put to particular use. On one hand, the complex structure of the layer 5 with a configuration (which repeats regularly in the profile direction 8) of elevations 29 and depressions 30 (waveform) which thereby determine a channel extent direction 27, and on the other hand an integration of alternately upwardly and downwardly pointing protuberances 18, enable a repeated deflection or vortices of the exhaust gas flowing along the channels, in such a way that new flow strands can be repeatedly formed (as indicated by arrows of first flow directions 26). As a result of the protuberances 18, openings 19, elevations 29 and depressions 30 of the at least very thin layer 5, highly rigid connections in the interior of the honeycomb body should be prevented, which is now achieved with the configuration proposed herein. For example, a connecting point 6 is shown for an elevation 29. That connecting point is composed of two brazing points 31 which are situated adjacent the apex of the elevation 29 and which are formed in this case in the manner of strips and parallel to the elevation 29. A connecting point 6 of that type can, in particular, be produced by virtue of an adhesive agent being applied (for example imprinted) in the region of the brazing points 31, the layers then being disposed so as to form the honeycomb structure, brazing powder being supplied through the channels through the end side to the adhesive agent, and the brazing material which adheres thereto ultimately forming a connecting point 6 after a thermal treatment of the honeycomb structure.

The invention claimed is:

1. A honeycomb body, comprising:
    a housing; and
    a honeycomb structure having a cross section within said housing and at least one at least partially structured metallic layer forming a multiplicity of channels and inner contact points within said cross section;
    at most 20% of said inner contact points in said cross section forming respective connecting points for fixing said honeycomb structure; and
    each of said connecting points being surrounded by a respective connection-free region defined by a distance between adjacent said connection points, each of said connection-free regions having an equal size relative to one another.

2. The honeycomb body according to claim 1, wherein said at least one at least partially structured metallic layer includes at least one stack of a plurality of alternating structured sheet-metal foils and smooth metallic layers forming said honeycomb structure, and said connecting points alternately connect said structured sheet-metal foils to adjacent metallic layers.

3. The honeycomb body according to claim 2, wherein said connecting points are disposed at mutually different spacings along said metallic layers.

4. The honeycomb body according to claim 2, wherein said at least partially structured metallic layers have extrema, and said connecting points are brazing points formed adjacent said extrema.

5. The honeycomb body according to claim 1, wherein said honeycomb structure has an axis and an extent with partial sections in direction of said axis, and said connecting points are formed only in at least one of said partial sections.

6. The honeycomb body according to claim 5, wherein two of said partial sections are spaced apart from one another in the direction of said axis, and said connecting points overlap each other in the direction of said axis.

7. The honeycomb body according to claim 2, wherein said honeycomb structure has an extent and said honeycomb structure is connected to said housing by all of said metallic layers and entirely over said extent.

8. The honeycomb body according to claim 1, wherein said at least one at least partially structured metallic layer has at least one protuberance or opening.

9. An exhaust-gas purification unit, comprising at least one honeycomb body according to claim 1.

10. A motor vehicle, comprising at least one exhaust-gas purification unit having at least one honeycomb body according to claim 1.

* * * * *